(12) United States Patent
Itakura et al.

(10) Patent No.: US 6,810,861 B2
(45) Date of Patent: Nov. 2, 2004

(54) EVAPORATION FUEL PROCESSING UNIT

(75) Inventors: Hideaki Itakura, Nagoya (JP); Naoya Kato, Ama-gun (JP); Masaki Takeyama, Okazaki (JP); Yoshinori Inuzuka, Okazaki (JP); Minoru Honda, Kariya (JP); Kouichi Oda, Kariya (JP)

(73) Assignees: Nippon Soken, Inc., Nishio (JP); Toyoda Boshoku Corporation, Kariya (JP)

( * ) Notice: Subject to any disclaimer, the term of this patent is extended or adjusted under 35 U.S.C. 154(b) by 24 days.

(21) Appl. No.: 10/341,357

(22) Filed: Jan. 14, 2003

(65) Prior Publication Data

US 2003/0136386 A1 Jul. 24, 2003

(30) Foreign Application Priority Data

Jan. 22, 2002 (JP) ........................................ 2002-013273

(51) Int. Cl.[7] .......................... F02M 33/04; F02M 7/00
(52) U.S. Cl. ...................... 123/516; 123/572; 123/519; 123/520
(58) Field of Search .............................. 123/516, 198 D, 123/572, 394

(56) References Cited

U.S. PATENT DOCUMENTS

| | | | | |
|---|---|---|---|---|
| 3,678,912 A | * | 7/1972 | Hensler | 123/518 |
| 4,212,276 A | * | 7/1980 | Kaneda | 123/519 |
| 4,422,416 A | * | 12/1983 | Bernardoni | 123/184.54 |
| 5,740,779 A | * | 4/1998 | Spencer-Smith | 123/394 |
| 6,422,191 B1 | * | 7/2002 | Braun et al. | 123/184.21 |
| 6,679,228 B1 | * | 1/2004 | Confer et al. | 123/516 |
| 2003/0070662 A1 | * | 4/2003 | Kim | 123/572 |

FOREIGN PATENT DOCUMENTS

| | | |
|---|---|---|
| JP | A 54-65213 | 5/1979 |
| JP | A 55-84846 | 6/1980 |
| JP | B2 59-5788 | 2/1984 |

* cited by examiner

*Primary Examiner*—Thomas N. Moulis
(74) *Attorney, Agent, or Firm*—Oliff & Berridge, PLC

(57) ABSTRACT

A shut off valve is provided in an intake line farther upstream than a throttle valve of the intake passage and farther downstream than an air cleaner. This shut off valve is opened by a signal or the like from an ECU when an engine is operating. Further, the shut off valve closes when the engine is stopped so as to suppress evaporative fuel inside the intake passage from flowing outside through the air cleaner. The evaporative fuel trapped inside the intake passage passes through a bypass passage that provides communication between the intake passage and the canister, and is then adsorbed with an adsorbent in the canister. A blow-by passage is also connected to the intake passage that is closed off by the shut off valve. Because the blow-by passage is closed off by a blow-by valve, which is closed during normal operation when the engine is stopped, sticking of the shut off valve and the throttle valve and the like due to the inflow of blow-by gas into the intake passage is inhibited.

10 Claims, 3 Drawing Sheets

EVAPORATION FUEL PROCESSING UNIT

INCORPORATION BY REFERENCE

The disclosure of Japanese Patent Application No. 2002-13273 filed on Jan. 22, 2002, including the specification, drawings and abstract is incorporated herein by reference in its entirety.

BACKGROUND OF THE INVENTION

1. Field of Invention

This invention relates to an evaporated fuel processing unit in an internal combustion engine. More particularly, this invention relates to an evaporative fuel processing unit capable of trapping evaporative fuel before it is discharged into the atmosphere from an intake passage of the internal combustion engine.

2. Description of Related Art

An evaporative fuel processing unit has been put into practical use that suppresses evaporative fuel from being discharged outside by leading hydrocarbon evaporating from a fuel tank, i.e., evaporative fuel, while a vehicle is running or stopped to a charcoal canister (hereinafter simply referred to as "canister"), and then adsorbing the evaporative fuel with an adsorbent in the canister.

While the vehicle and the internal combustion engine are stopped, some fuel may leak into the intake port from the nozzle hole of an injector (i.e., fuel injection valve) provided in an intake port and a cylinder, and some fuel may adhere onto the wall of the intake port, creating a so-called fuel wet. The fuel may then evaporate and flow to the outside through an outside air opening in the air cleaner. As the regulations concerning evaporative fuel have recently become more stringent, these fuels are starting to be seen as a problem.

Further, Japanese Patent Application Laid-Open Publication No. 55-84846 discloses a system in which, in order to trap fuel that evaporates from not only a fuel tank but also a carburetor with a canister when the internal combustion engine is stopped, an intake passage on the upstream or downstream side of the throttle valve is connected to a canister provided to trap fuel that evaporates from the fuel tank. Further, this system processes the fuel by desorbing the fuel trapped in the canister while the internal combustion engine is operating and drawing the desorbed fuel into the intake passage. Because the throttle valve does not completely close off the intake passage even when the internal combustion engine is operating, however, there is a possibility that the evaporative fuel that leaks upstream from the throttle valve while the engine is stopping may be discharged into the atmosphere through the air cleaner in the case where the intake passage is connected to the canister on the downstream side of the throttle valve.

Needless to say, when the intake passage is connected to the canister on the upstream side of the throttle valve, the air cleaner provides constant communication between the intake passage from the throttle valve to the air cleaner and the atmosphere. Therefore, a large portion of the evaporative fuel accumulated in the intake passage from the throttle valve to the air cleaner is not introduced to the canister. As a result, a similar problem exists due to that portion of the evaporative fuel flowing out into the atmosphere from the outside air opening of the air cleaner.

Moreover, Japanese Patent Application Laid-Open Publication No. 54-65213 discloses a system in which a check valve is provided in the outside air opening of the air cleaner to close off the inlet to the intake passage when the internal combustion engine is stopped so as to trap evaporative fuel accumulated in the intake passage with a canister. However, a blow-by line from the crankcase of the internal combustion engine is connected to the intake passage that is closed off in this case, so unburned fuel which does not evaporate easily and which contains blow-by gas, as well as minute particles of engine oil and the like are introduced into the canister. These components adhere to the adsorbent inside the canister and lower the adsorption capability, so it is possible that the original function of the canister may be lost.

SUMMARY OF THE INVENTION

A first aspect of the invention relates to an evaporative fuel processing unit. This processing unit is provided with a passage that provides communication between an intake passage of the internal combustion engine and a canister, a passage that provides communication between a crankcase of the internal combustion engine and the intake passage, and a valve that is provided farther upstream in the intake passage than the location where those passages are connected together. This valve is able to make the downstream of the valve a substantially closed space by closing off the intake passage. Accordingly, evaporative fuel that accumulates in this intake passage will not leak out upstream of the valve and be discharged into the atmosphere. The trapped evaporative fuel passes through the passage that provides communication between the intake passage of the internal combustion engine and the canister and is adsorbed by the adsorbent in the canister.

The evaporative fuel adsorbed by the adsorbent in the canister is then desorbed by a flow of air that passes through the canister when the internal combustion engine is operating, and is introduced into the intake passage, just as it is ordinarily. After being introduced into the intake passage, that fuel is then burned in the cylinders together with fuel injected by an injector (i.e., fuel injection valve) and processed.

Moreover, because the foregoing processing unit has a valve that closes off the canister from the crankcase by closing when the engine is stopped, it is possible to minimize unburned fuel that does not evaporate easily and which contains blow-by gas from being adsorbed by the adsorbent in the canister.

"Make the downstream side of the intake passage a substantially closed space" means that an exhaust pipe side may be open downstream of the valve by an exhaust valve and an intake valve of the internal combustion engine.

BRIEF DESCRIPTION OF THE DRAWINGS

The foregoing and further objects, features and advantages of the invention will become apparent from the following description of preferred embodiments with reference to the accompanying drawings, wherein like numerals are used to represent like elements and wherein.

DETAILED DESCRIPTION OF PREFERRED EMBODIMENTS

Next, the preferred embodiments of the invention shall be described with reference to the accompanying drawings.

Figure 1:
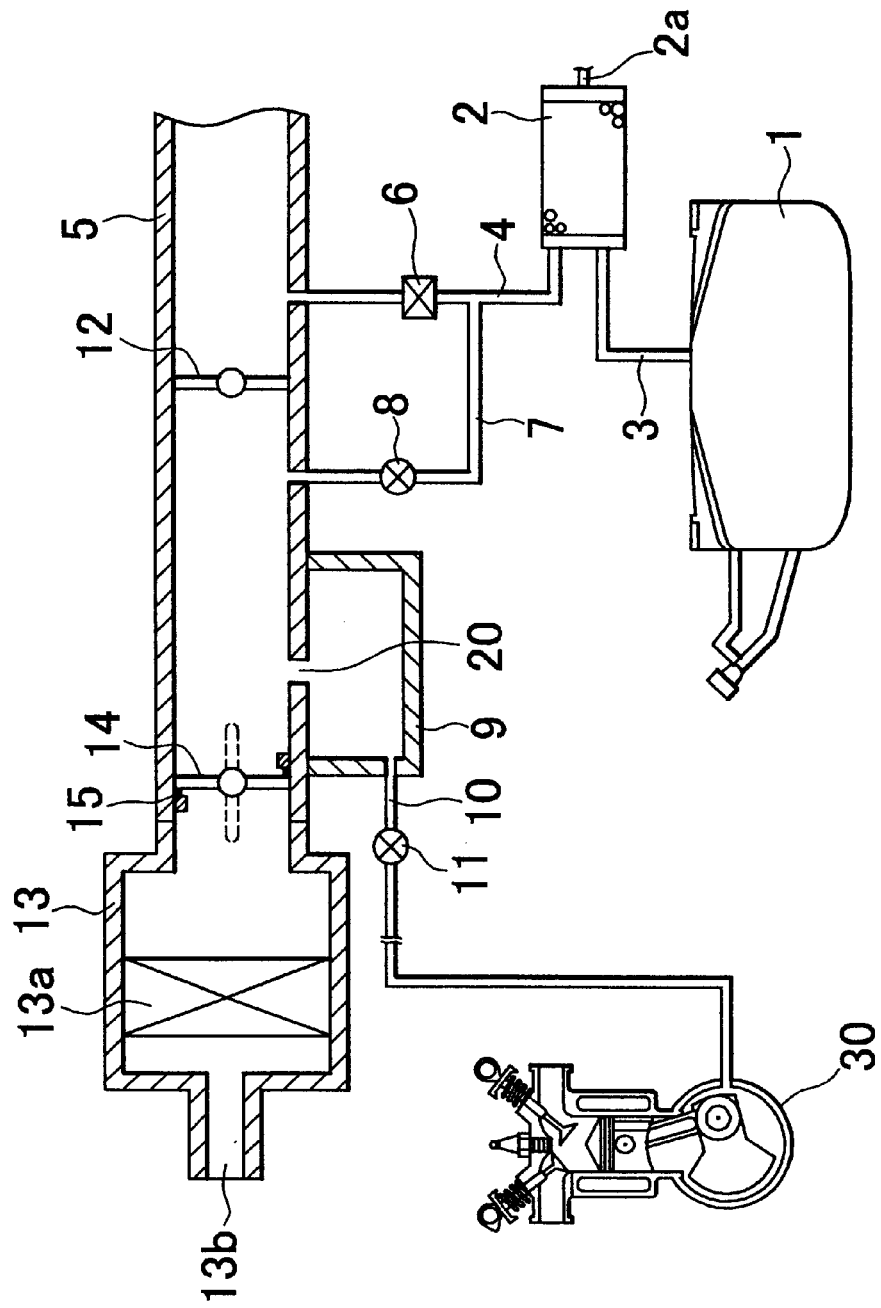
FIG. 1 is a system block diagram showing an evaporative fuel processing unit according to a first exemplary embodiment of the invention.

FIG. 1 is a block diagram showing the construction of a first exemplary embodiment of the invention. In the figure, an evaporative fuel line 3 forming a fuel tank passage provides communication between an upper space in a fuel tank 1 and a canister 2. A purge line 4 forming a purge passage is also connected to the same end side of the canister 2 as the evaporative fuel line 3. The other end of the purge line 4 is connected to an intake line 5 forming an intake passage on the downstream side of a throttle valve 12. A purge valve 6 that is closed during normal operation is provided midway in the purge line 4. During operation of the internal combustion engine, this purge valve 6 is opened by a duty ratio signal sent from an electronic control unit (i.e., ECU), not shown, such that evaporative fuel adsorbed in the canister 2 is introduced into the intake line 5. A bypass line 7 forming a bypass passage that branches off midway from the purge line 4 bypasses the purge valve 6 and is connected to the intake line 5 on the upstream side of the throttle valve 12.

A bypass valve 8 that is open during normal operation is provided midway in the bypass line 7. This bypass valve 8 is open while the internal combustion engine is stopped and closes with a command from the ECU while the internal combustion engine is operated. Also, a resonator 9, which includes a space of a predetermined capacity, is attached to the intake line 5. A communication opening 20 provides communication between this resonator 9 and the inside of the intake line 5. Meanwhile, the resonator 9 is also connected to a crankcase 30 of the internal combustion engine main body by a blow-by line 10 forming a blow-by passage. A blow-by valve 11 is provided midway in this blow-by line 10. The blow-by valve 11 is closed during normal operation and opens by a command from the ECU only when the internal combustion engine is being operated.

An air cleaner 13 is provided with an air cleaner element 13a across the intake passage and an outside air opening 13b. A shut off valve 14 which is closed during normal operation is disposed between the throttle valve 12 and the air cleaner 13 so that the intake passage can be shut off. This shut off valve 14 is constructed so as to fully open, as shown by the broken line in the figure, automatically either by a command from the ECU, not shown, or by the flow of intake air during operation of the internal combustion engine. It is preferable that the shut off valve 14 be positioned farther upstream in the intake line 5 than, and as far away as possible from, the communication opening 20 which is between the resonator 9 and the intake line 5 so as to avoid sticking or the like from blow-by gas. Moreover, packing 15 is also provided in order to increase the sealing capability when the shut off valve 14 is closed.

Next, operation of the evaporative fuel processing unit according to the first exemplary embodiment of the invention shall be described. The shut off valve 14 is closed while the internal combustion engine is stopped. When fuel (i.e., fuel leaked from an oil tight portion) leaked from the nozzle hole of the injector (i.e., fuel injection valve) of the internal combustion engine main body, not shown, into the intake port or the combustion chamber, or fuel adhered to the wall of the intake port in the form of a fuel wet, evaporates when the air temperature rises, that evaporative fuel flows through the bypass line 7 that is connected to the intake line 5, through the bypass valve 8 that is open during normal operation, which is open when de-energized, through part of the purge line 4, and then into the canister 2. The fuel that flows into the canister 2 is then adsorbed by the adsorbent therein. However, because the amount of that fuel is low compared to the amount of fuel that evaporates in the fuel tank 1 and flows into the canister 2, the load on the canister 2 does not increase very much.

Also, during operation of the internal combustion engine, outside air is introduced through an outside air opening 2a of the canister 2, and the evaporative fuel adsorbed in the canister 2 is desorbed. Further, the purge valve 6 is opened so that the desorbed evaporative fuel is introduced into the intake line 5. This desorbed evaporative fuel is then mixed with fuel injected from the injector and combusted in the cylinders. Therefore, when the internal combustion engine is stopped, the canister 2 is always able to adsorb the evaporative fuel. This operation inhibits the evaporative fuel from being discharged into the air from the outside air opening 13b of the air cleaner 13.

Moreover, the shut off valve 14 is disposed closer to the air cleaner 13 than the throttle valve 12 and the communication opening 20 that provides communication between intake line 5 and the resonator 9, through which the blow-by gas flows into the intake line 5. As a result, fuel and engine oil and the like are inhibited from reaching the shut off valve 14 while the internal combustion engine is operating, thus inhibiting sticking of the shut off valve 14. The shut off valve 14 can also be used as a traction control valve, which keeps the number of parts from increasing and therefore keeps costs from rising.

According to the first exemplary embodiment of the invention, the blow-by valve is closed while the internal combustion engine is stopped, such that blow-by gas is suppressed from flowing into the intake passage. As a result, sticking of the valve and the like in the intake passage due to components containing blow-by gas is inhibited.

While the internal combustion engine is stopped, the throttle valve 12 is open so sticking of the throttle valve 12 due to fuel and engine oil and the like is inhibited.

Figure 2:
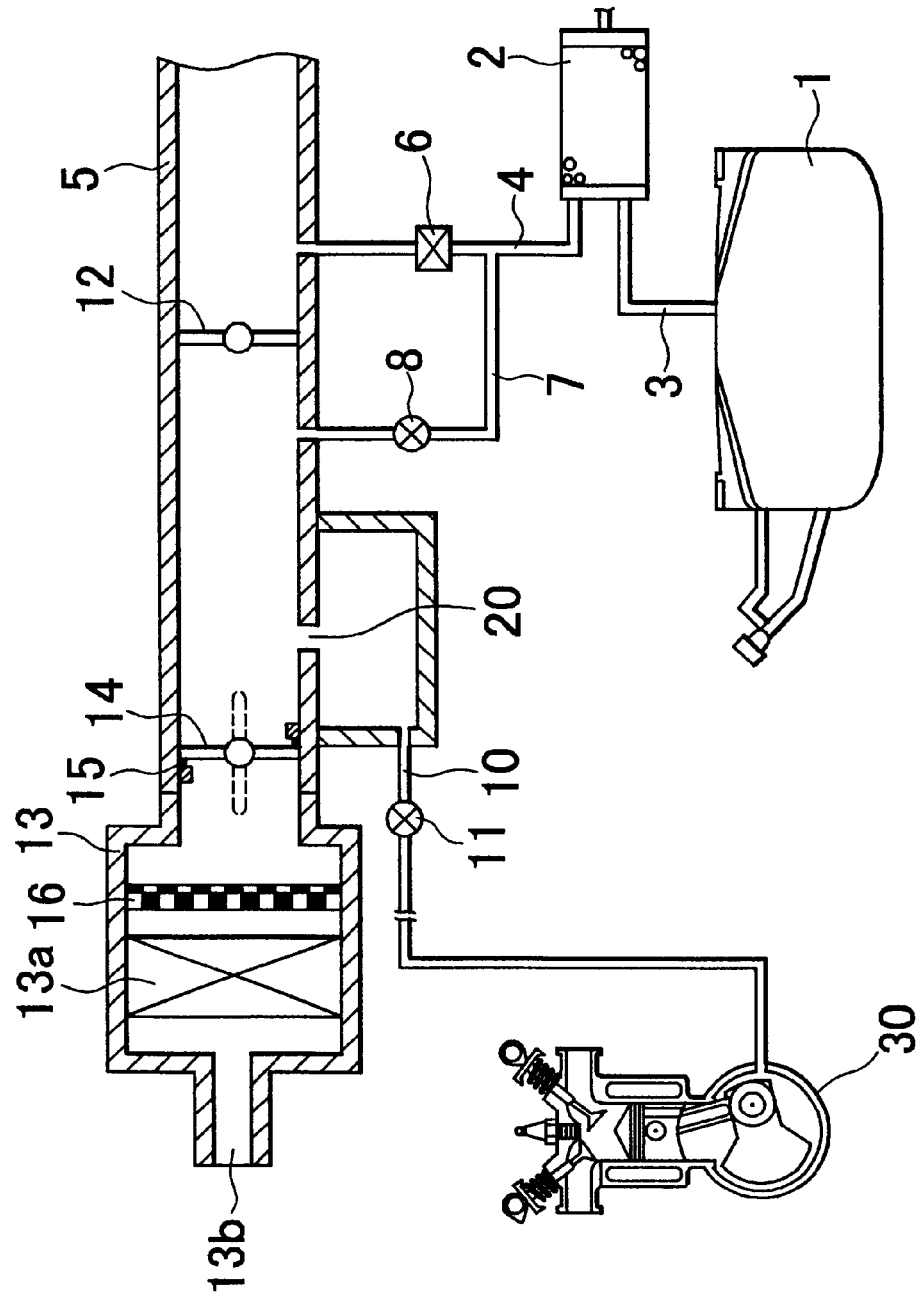
FIG. 2 is a system block diagram showing an evaporative fuel processing unit according to a second exemplary embodiment of the invention.

Next, an evaporative fuel processing unit according to a second exemplary embodiment of the invention shall be described with reference to FIG. 2. The basic construction of the second exemplary embodiment is similar to that of the first exemplary embodiment. Therefore, like portions shall be denoted by like reference numerals, and detailed descriptions thereof shall be omitted. The evaporative fuel processing unit according to the second exemplary embodiment differs from that according to the first exemplary embodiment in that an adsorbent sheet 16, which carries an adsorbent that adsorbs evaporative fuel, is disposed in the air cleaner 13 across the intake passage farther downstream than the air cleaner element 13a. The adsorbent sheet 16 is disposed in the air cleaner 13 on the assumption that the sealing capability of the shut off valve 14 may be lost due a foreign object obstructing closure of the shut off valve 14. The evaporative fuel that attempts to flow upstream through the intake passage while the internal combustion engine is stopped and out to the outside air through the air cleaner is adsorbed by this adsorbent sheet 16. As a result, that outflow of the evaporative fuel to the outside is able to be reliably inhibited.

The evaporative fuel adsorbed by the adsorbent sheet 16 is then desorbed by the air that is drawn in through the outside air opening 13b of the air cleaner 13 while the internal combustion engine is operating. As a result, the adsorbing capability of the adsorbent sheet 16 is always restored when the internal combustion engine is stopped. This enables the evaporative fuel generated when the internal combustion engine is stopped to be reliably adsorbed.

Figure 3:
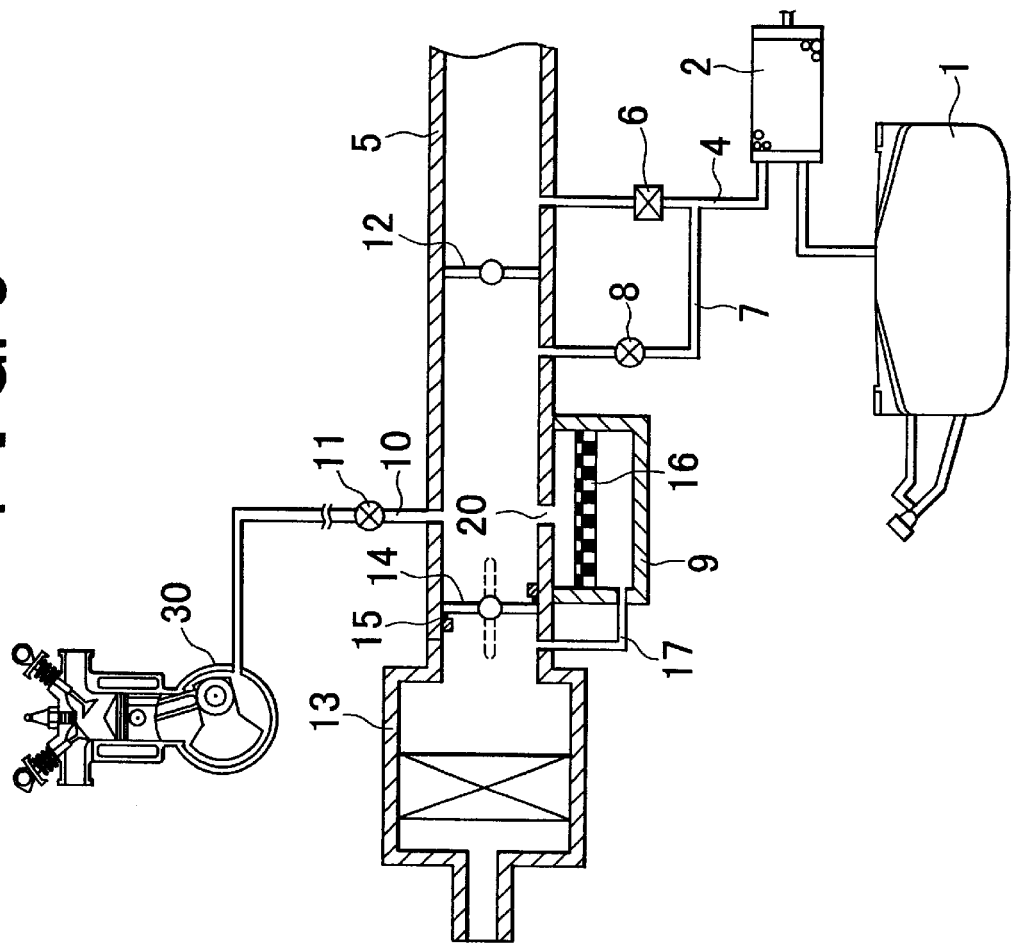
FIG. 3 is a system block diagram showing an evaporative fuel processing unit according to a third exemplary embodiment of the invention.

Next, an evaporative fuel processing unit according to a third exemplary embodiment of the invention shall be described with reference to FIG. 3. The basic construction of the third exemplary embodiment is similar to that of the first and second exemplary embodiments. Therefore, like portions shall be denoted by like reference numerals, and detailed descriptions thereof shall be omitted. The evaporative fuel processing unit according to the third exemplary embodiment differs from that according to the first and second exemplary embodiments in that the blow-by line 10 is directly connected to the intake line 5, instead of being connected via the resonator 9, and that the adsorbent sheet 16 which carries the adsorbent is disposed inside the resonator 9 across the flow path. The blow-by line 10 which has the blow-by valve 11 opens to the intake line 5 on the side opposite the communication opening 20 of the resonator 9. An outside air line 17 provides communication between a space in the resonator 9 on the side opposite the space with the communication opening 20 across the adsorbent sheet 16, and the air cleaner 13.

When the internal combustion engine is stopped, the adsorbent sheet 16 adsorbs the evaporative fuel accumulated in the intake passage farther downstream than the shut off valve 14 via the communication opening 20. The evaporative fuel desorption and adsorption capabilities of the adsorbent sheet 16 are restored as follows. Intake air negative pressure draws outside air into the resonator 9 from the air cleaner 13 via the outside air line 17 while the internal combustion engine is operated. That outside air that is drawn in then passes through the adsorbent sheet 16 and desorbs the evaporative fuel that was adsorbed by the adsorbent sheet 16. The outside air that contains the desorbed evaporative fuel then passes through the communication opening 20 and merges with outside air flowing through the intake line 5.

According to the aforementioned construction, the evaporative fuel accumulated in the intake passage can be adsorbed by the adsorbent in the resonator that is closer to the intake passage than to the canister.

In the second and third exemplary embodiments, the adsorbent is provided in the air cleaner 13 and the resonator 9, respectively. Alternatively, however, the adsorbent may be provided in an arbitrary location closer to the internal combustion engine than the canister in the intake passage.

In the above embodiments, the bypass line 7 is provided with the evaporative fuel processing unit. However, the bypass line 7 may not be provided. In this case, the purge valve 6 may be opened while the internal combustion engine is operated.

In the above embodiments, the blow-by valve 11 is used as a valve that shuts off communication between the canister 2 and the crankcase 30 by closing when the internal combustion engine is stopped. However, a valve may be provided in an arbitrary location between the crankcase 30 and canister 2. The valve may be used as a valve that shuts off communication between the canister 2 and the crankcase 30 by closing when the internal combustion engine is stopped.

In the above embodiments, the purge line 4 and the evaporative fuel line 3 are connected on the same side of the canister 2.

While the invention has been described with reference to what are considered to be preferred embodiments thereof, it is to be understood that the invention is not limited to the disclosed embodiments or constructions. On the contrary, the invention is intended to cover various modifications and equivalent arrangements. In addition, while the various elements of the disclosed invention are shown in various combinations and configurations, which are exemplary, other combinations and configurations, including more, less or only a single element, are also within the spirit and scope of the invention.

What is claimed is:

1. An evaporative fuel processing unit comprising:
   a canister that adsorbs an evaporative fuel from a fuel tank of an internal combustion engine with an internal adsorbent in the canister and suppresses discharge of the evaporative fuel into the atmosphere;
   a first passage in which a first end portion thereof is connected to the canister, and a second end portion thereof is connected to the fuel tank;
   a second passage in which a first end portion thereof is connected to an intake passage of the internal combustion engine, and a second end portion thereof is connected to the canister;
   a third passage in which a first end portion thereof is connected to a crankcase of the internal combustion engine, and a second end portion thereof is connected to the intake passage;
   a first valve that shuts off communication between the canister and the crankcase by closing when the engine is stopped; and
   a second valve which is provided farther upstream that a location where the second passage and the third passage are connected in the intake passage, the second valve capable of making the downstream of the second valve a substantially closed space by closing off the intake passage.

2. The evaporative fuel processing unit according to claim 1, wherein
   the first end portion of the first passage is connected to a first end portion side of the canister;
   the second end portion of the first passage is connected to an upper space of the fuel tank; and
   the second end portion of the second passage is connected to the first end portion side of the canister.

3. The evaporative fuel processing unit according to claim 1, wherein
   the second end portion of the third passage is connected to the downstream side of the second valve.

4. The evaporative fuel processing unit according to claim 1, further comprising packing provided in the intake passage to increase sealing capability of the second valve.

5. The evaporative fuel processing unit according to claim 1, further comprising an adsorbent which adsorbs and desorbs the evaporative fuel, and is provided across the intake passage farther downstream than an air cleaner element inside an air cleaner disposed on the upstream side of the second valve.

6. The evaporative fuel processing unit according to claim 1, wherein the third passage is connected to the intake passage via a resonator.

7. The evaporative fuel processing unit according to claim 1, wherein the third passage communicates directly between the intake passage and the crankcase.

8. The evaporative fuel processing unit according to claim 7, further comprising an adsorbent which adsorbs and desorbs the evaporative fuel, and is provided inside a resonator, wherein a space on a side away from the adsorbent when viewed from a communication opening between the intake passage and the resonator is connected via a fifth passage to the intake passage between an air cleaner element disposed on the upstream side of the second valve and the second valve.

9. The evaporative fuel processing unit according to claim 8, wherein the fifth passage is connected to the air cleaner.

10. The evaporative fuel processing unit according to claim 1, further comprising an adsorbent which is positioned closer to the canister than the internal combustion engine, and which is provided downstream of an air cleaner element of an air cleaner disposed on the upstream side of the second valve.

* * * * *